2,521,566

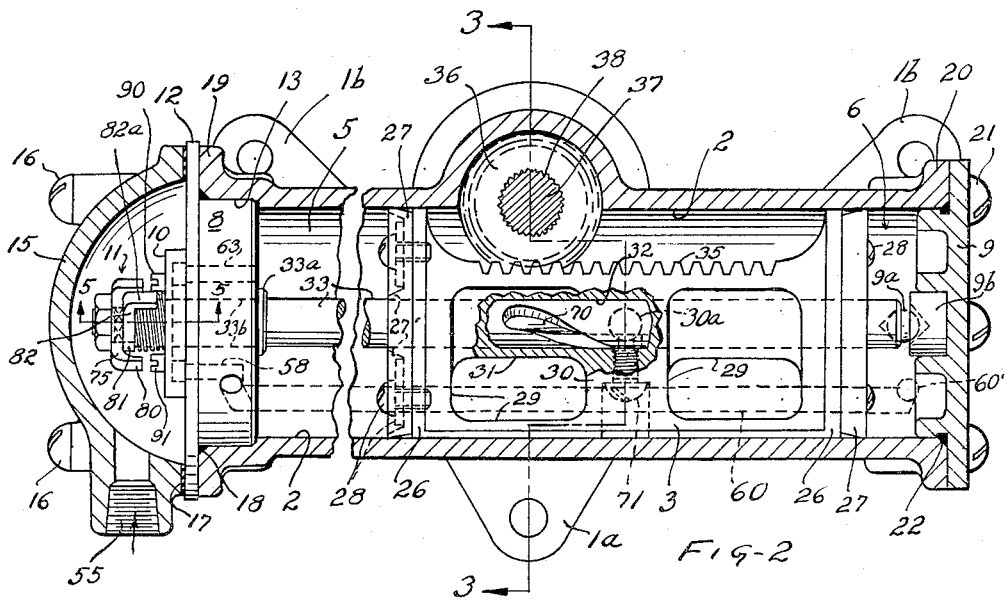
Fig-2
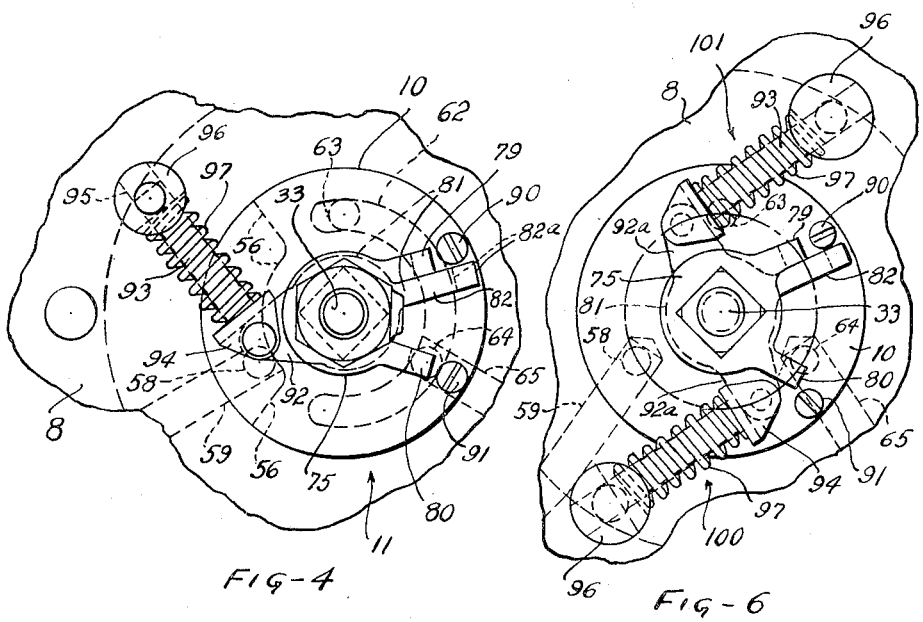
Fig-4
Fig-6
INVENTOR.
LEROY J. CAREY
BY George M Soule
ATTORNEY Patented Sept. 5, 1950

UNITED STATES PATENT OFFICE 2,521,566

FLUID OPERATED RECIPROCATING MOTOR WITH ROTARY REVERSING VALVE

Leroy J. Carey, Cleveland, Ohio, assignor to The Marquette Metal Products Company, Cleveland, Ohio, a corporation of Ohio Application May 9, 1946, Serial No. 668,431

12 Claims. (Cl. 121—164)

This invention relates to reciprocating fluid operated motors and the principal object is to provide a heavy duty motor of the indicated class which will be sufficiently positive in operation to serve as a windshield wiper motor in fields such as represented by common carriers.

A specific object is to provide a reciprocating fluid operated motor having an improved valve operating mechanism for automatically reversing the supply and exhaust of operating fluid in respect of the pressure chambers of the motor.

Another object is to provide a heavy duty windshield wiper motor capable of operating in a positive manner when supplied with an elastic fluid such as compressed air and notwithstanding considerable variations in supply pressure.

A further object is to provide in a fluid operated reciprocating motor a simple, inexpensive and efficient reversing valve system and operating means therefor connected for actuation by a main power piston of the motor.

Other objects include the provision of a fluid operated motor having oscillating power take-off and other shafting with supporting and sealing means so arranged as to enable operation of the motor for long periods of time without requiring lubrication service.

Other objects and features of the invention will become apparent from the following description of the preferred form shown in the accompanying drawings. The essential characteristics are defined in the claims.

In the drawings:

Fig. 2 is a central sectional view thereof as indicated by the line 2—2 on Fig. 1;

Fig. 3 is a transverse sectional view taken as indicated by the line 3—3 on Fig. 2;

Fig. 4 is a fragmentary end view of the reversing valve and snap action mechanism of the motor;

Fig. 5 is a detail sectional view of the valve and snap action toggle mechanism, in one form, taken along the line 5—5 on Fig. 2;

Fig. 6 is a view corresponding to Fig. 4 showing a modified snap action toggle mechanism; and Fig. 7 is a sectional detail view, similar to Fig. 6, showing a further modified form of toggle snap action mechanism.

Figure 1:
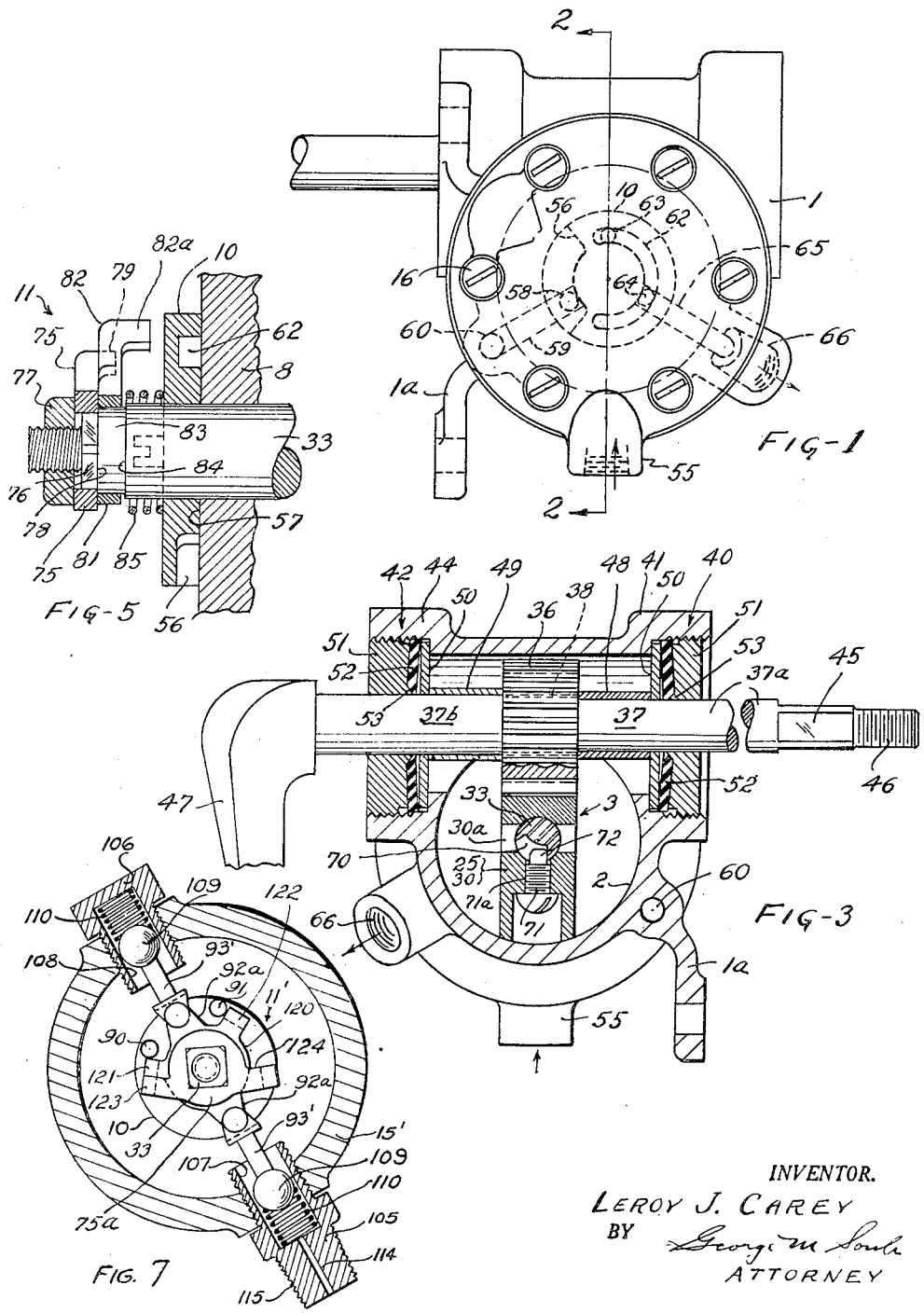
Fig. 1 is an end view of the motor.

Referring in detail to the drawing, Figs. 1, 2 and 3, a main central housing member 1, preferably a casting and of generally cylindrical form, which may be mounted on a supporting structure as by bolts passing through apertured brackets 1a and 1b integral with the housing, provides a smooth piston guide and cylinder bore 2 for a double headed piston 3. Alternately supplied and exhausted pressure chambers are formed at opposite ends of the piston as at 5 and 6, which chambers are closed outwardly in line with the piston heads by disc-like fittings forming cylinder heads 8 and 9 respectively.

The cylinder head fitting 8, left, Fig. 2, is a generally circular metal body fitting a counterbore 13 in the housing, said body serving as one support for a reversing valve disc or plate 10 and a valve-actuating snap action mechanism 11, to be described later. The fitting 8 has a flat circular flange 12 coextensive with and secured against a flange portion 19 of the housing 1. A hollow hemispherical fluid inlet manifold fitting 15, the circular rim of which is substantially coextensive with the flange 12, completes the housing for the mechanism 10, 11. The fitting 15 is forced toward said flange 12 as by a circular series of securing screws 16 and preferably there is a sealing gasket 17 between the rim of the fitting 15 and the flange 12. The inner side of the flange 12 compresses an annular sealing ring 18 against other wall surfaces defining a complementary recess at the outer end of the counterbore 13.

The cylinder head fitting 9, right, Fig. 2, is directly secured to the end of the housing 1 containing the pressure chamber 6 at an appropriate flange 20 thereof by securing screws 21 entering said flange 20. A sealing ring 22 is compressed between the fitting 9 and a complementary recess partly formed in the flange 20.

The shape of the piston 3 may be seen by comparison of Figs. 2 and 3, the central body portion 25 of the piston being generally rectangular in form and having circular disc-like head portions 26 of identical form integral with said body. Flexible sealing cups 27 of annular form fitting the cylinder bore 2 are secured to the circular head portions 26 as by fastening screw and metal ring assemblies 28. In order to reduce the weight of the body portion of the piston as much as possible consistent with rigidity and strength, the rectangular portion is provided with through openings at 29 (Fig. 2 only) longitudinally adjacent end portions of a central transverse wall 30 and, partly defining the openings 29, the piston body has a tubular portion 31 integral with the wall 30 and respective head portions 26 of the piston. The tubular portion 31 is axially bored at 32 slidably and rotatably to receive a shaft 33 connected with the valve mechanism 10, 11 as will be described later. The shaft 33 is concentric with the piston heads and supported at its ends on appropriate bearings in the cylinder end closure assemblies. Flange portions 27' of the sealing cups 27 fit around the smooth surface of the shaft 33 further to seal the pressure spaces 5 and 6 of the motor.

To convert the reciprocating motion of the piston to oscillating motion the upper side of the rectangular body portion 25 of the piston has rack teeth formed thereon at 35 for meshing engagement with a pinion 36 supported in a plane cutting the shaft 33 on an oscillatable power takeoff shaft 37. The power takeoff shaft is suitably keyed to the pinion as by spline serrations 38 and a relatively smaller diameter portion 37a of the shaft extends through a bearing and seal assembly 40 at one side of the motor and carried on a generally circular flange portion 41 of the housing 1. A similar bearing and seal assembly 42 supports the relatively larger diameter portion 37b of the shaft; and the assembly 42 is mounted in a generally circular flange portion 44 of the main housing. The outwardly projecting end of the shaft portion 37a has a driving key portion 45 and is threaded therebeyond as at 46 for mounting a suitable windshield wiper arm.

The relatively larger diameter portion 37b of the shaft carries an emergency operating handle 47 which may be used to operate the wiper arm in event of power failure in the vehicle served by the motor mechanism hereof.

To center the driving pinion 36 and hold it properly in mesh with the rack teeth 35, spacers 48 and 49 are provided at opposite ends of the pinion for limiting abutment with circular metal discs 50 comprising respective parts of the bearing and seal assemblies 40 and 42.

Said assemblies 40 and 42 are substantially alike in construction and may be identical with the disclosure of my Patent 2,368,744 issued February 6, 1945 and owned by the assignee hereof. Each bearing and seal assembly comprises an outer circular threaded metal plate or disc 51 centrally apertured to receive and form a bearing support for the associated shaft portion and provided with suitable wrench engaging means (not shown) for enabling the disc 51 to be screwed tightly into a respective threaded portion of the housing in marginally compressing relation to flexible sealing disc 52, preferably of synthetic rubber. The outer margins of the sealing discs are forced tightly against respective metal discs 50 and the adjacent inner peripheral surface of the housing 1, thus forming an outer seal (remote from the shaft). Each of the threaded discs 51 has a conical portion 53 adjacent a chamfered portion of the resilient disc 52; and the conical portion rides on the inner circumferential surface of the disc 52 to cause the corner portion thereof around the central shaft-receiving opening and opposite the conical portion 53 to press firmly upon the associated shaft portion and form an effective seal. The circular plates 50 limit the flexing movement of the sealing discs 52 inwardly toward the pinion 36 and also serve to hold the pinion positioning sleeves 48 and 49 in position.

The fluid supply system for the motor includes an inlet portion 55 of the pressure fluid manifold fitting 15. Active fluid pressure is thereby maintained adjacent all faces of the reversing valve disc 10 which are exposed within the manifold. The valve disc is radially open at one side as shown by comparison of Figs. 4 and 5 to form a fluid entrance cavity 56 adjacent the flat surface 57 of the cylinder head or closure member 8, which surface forms a valve land intercepted by circularly arranged ports in or through said member 8 at right angles to said face. Thus the cylinder head 8 constitutes a main valve body and will be sometimes so referred to hereinafter.

The valve ports which intersect the land face 57 of the cylinder head and valve body member 8 are designated 58, 63 and 64 as shown by dotted lines only in Figs. 1 and 4. The port 58 leads through the body 8 so as to communicate through a radial passage portion 59, Fig. 1, with a longitudinally extending bore or passage 60 formed in the main housing and leading to the pressure chamber 6 of the motor, communicating therewith by a short radial passage 60', Fig. 2. The ports 58, 63 and 64 are spaced 120° apart about the axis of the valve body 8.

The port 63 is the fluid supply and exhaust port for the pressure chamber 5, Fig. 2, and is simply a longitudinal eccentrically disposed bore through the valve body 8. The port 64 leads part way through the body 8 from the valve land face 57 and then radially as at 65, Fig. 1, through the body 8 for communication with an exhaust outlet 66 formed in the main housing 1 substantially in the transverse plane of said body 8. The ports 58 and 63 communicate alternately with the supply cavity 56 of the valve disc 10 and a circumferentially closed groove or slot 62 of the valve disc. Said slot is open adjacent the valve land face 57 as illustrated in Fig. 5. The slot 62 is of sufficient extent so that, when the valve disc is moved approximately 50° clockwise from its illustrated position, the slot still communicates with the exhaust port 64 but then communicates also with the port 58 of the body 8 so as to open communication between the pressure space 6 and the exhaust outlet 66. In the rotated position of the valve disc 10 just described, the inlet cavity 56 is open to communicate with the port 63, thus supplying active pressure fluid to the chamber 5 and causing movement of the piston to the right, Fig. 2. Thus, assuming pressure supply, in the illustrated one of the two rotated positions of the valve disc 10 described, the piston moves to the left, Fig. 2, and in the second position, not illustrated, the piston moves to the right.

The reversing mechanism for the valve disc 10 is primarily the shaft 33 which, in addition to extending for free relative longitudinal and rotating movement through the piston, is also supported for turning movement only by the main housing assembly, including the cylinder head closure members 8 and 9. The shaft 33 has a shoulder 33a, Fig. 2, bearing against the inner face of the cylinder head body 8 and the shaft extends as at 33b through suitable bores in the body 8 and the valve disc. The arrangement enables the shaft to turn easily in the body 8 and the valve disc to turn easily on the shaft. At its opposite end the shaft 33 has a suitable axial thrust bearing support shown as comprising a hard metal ball 9a supported in oppositely facing sockets in the end of the shaft 33 and an inset block 9b of the cylinder head 9.

Due to the meshing relationship of the rack teeth 35 and those of the pinion 36, the piston cannot turn in its cylinder bore during reciprocation. The relative motion between the longitudinally fixed shaft 33 and the piston is used to cause oscillation of the shaft 33 through the angle required to reverse the valve mechanism by providing a helical groove 70 in the shaft extending generally longitudinally thereof to a sufficient extent to enable a follower connection to be established with the piston throughout its entire travel. The follower connection preferably comprises a screw 71 extending vertically through a threaded opening 71a in the piston wall portion 30. The screw has a reduced diameter hardened follower portion 72 riding in the groove 70. The groove, as shown by Fig. 3, when cut by a plane normal to the axis of the shaft 33, has divergent side walls (e. g. 29° included angle) so that the side walls of the slot are parallel to the hardened cylindrical surfaces of the screw portion 72. With that arrangement the follower rides smoothly in the slot from end to end and has ample bearing against the side walls of the slot to cause the shaft to turn and substantially without play or lost motion.

For lubrication of the contacting surfaces of the bore 32 of the piston and the smooth cylindrical surface of the shaft, as well as for lubricating the pin and slot camming connection just described, the wall portion 30 of the piston has a pair of aligned openings 30a, see Fig. 3, adjacent the shaft and which communicate with the generally open space between the piston heads. That space may, during assembling of the motor, be provided with a suitable supply of lubricant preferably a heavy grease. Some of the grease, in addition to supplying the bearing and groove surfaces of the shaft 33 with lubricant, works into the clearance spaces between the positioning spacers 48 and 49 for the power takeoff pinion 36 and the adjacent end faces of the pinion for lubrication of both portions 37a and 37b of the oscillating drive shaft 37. Sufficient lubricant escapes as slip past the sealing disc 52, Fig. 3, to supply the coacting bearing surfaces of the shaft 37 and the bearing plates 51.

Referring to Figs. 2, 4 and 5, showing the valve actuating toggle mechanism, a toggle operating double armed or yoke member 75 is shown as keyed to the shaft 33 as at a non-circular end portion 76 of the shaft. The yoke 75 is further fixed to the shaft by a clamping nut 77 which forces the inner face of the yoke against a shoulder 78 on the shaft. The yoke 75 has its two arms extending radially and spaced apart substantially 50° and the ends of the arms are turned toward the valve disc to provide circumferentially spaced lug elements 79 and 80. The lugs terminate in spaced relation to the valve disc. A toggle lever 81 is journalled for free rotation on a reduced diameter portion 83 of the shaft defined by the shoulder 78 and another shoulder 84 on the shaft. A compression coil spring 85 on the projecting portion of the shaft 33 forces against the valve disc 10 in one direction to hold the valve disc seated on the land face 57 of the valve body 8 (cylinder head) and at the opposite end bears against the central hub portion of the toggle lever 81 to hold the latter in slidable contact with the inner face of the yoke 75.

The toggle lever 81 has an arm 82 in the plane of the lug portions 79 and 80 of the yoke 75 for abutment thereby due to the partial rotation of the shaft 33. Said arm 82 of the toggle lever extends radially beyond the lugs 80 and toward the valve plate at 86 for alternate valve actuating contact with a pair of parallel pins 90 and 91 projecting outwardly from the exposed face of the valve disc and spaced about 60° apart. The toggle lever arm 82 has a lug portion 82a positioned in the transverse plane of the pins 90 and 91 for operating contact therewith.

Diametrally opposite from the arm 82 of the toggle lever, an arm 92 of said lever pivotally carries a yoked end 94 of a spring supporting pin 93 forming a cooperating toggle arm. The end of the pin 93 remote from the yoked portion 94 of the pin is slidably secured in a transverse bore 95 of a toggle supporting block member 96 freely pivotally secured to the cylinder head member 8. A compression toggle spring 97 bears at one end against the yoked end of the pin 93 and at its opposite end against the pivoted supporting block 96.

Thus, in the position of toggle parts illustrated in Fig. 4, the spring 97 tends to force the toggle lever 81 in a counter-clockwise direction. The lever arm 82 is shown in the position which the lug 80 of the yoke 75 has moved said lever arm in order to turn the valve disc from its previously occupied position into the illustrated position by contact with the pin 90 of the valve disc. To move the valve disc 10 into its other final position (not illustrated), the lug 79 through rotation of the operating shaft 33 moves the toggle lever arm 82 into a position in contact with the valve disc pin 91, in which position the arms 92 and 93 of the toggle mechanism are axially aligned or on dead center. A slight further rotary movement of the shaft 33 necessary to cause the lug 79 to move the arm 92 past the dead center position (but still without reversing the valves) causes sudden rotation of the valve disc into its second described position in which the fluid force on the piston is reversed.

While the helical cam slot 70 of the valve actuating shaft 33 may have a width only slightly greater than the diameter of the cam follower pin portion 72, Fig. 3, the slot may be considerably wider so as to provide a dwell in the operation of the shaft at each end of each stroke of the piston 3. By varying the dwell period the angular motion of the power takeoff shaft may be varied. With a wider cam slot, when the piston movement is reversed by operation of the toggle mechanism and reversing valve, the initial return movement of the piston will not rotate the shaft 33. Rotation of the shaft begins when the lost motion between the pin and the slot has been taken up by the return movement of the piston. Thus by varying the width of the helical slot, I can increase or decrease the throw of the wiper drive arm as desired. The particular shaft 33 to be installed in a motor for a particular service is selected from stock in accordance with the desired angular movement of the wiper arm about the axis of the drive shaft in order to perform that service.

A modified arrangement of toggle mechanism is shown by Fig. 6. The mechanism is generally the same as previously described except that the toggle lever has two toggle arms 92a disposed oppositely of each other about the axis of the shaft 33. The two toggle spring and pin assemblies 100 and 101 have the same arrangement and support as described in connection with the toggle mechanism of Fig. 4 and the individual parts are similarly numbered. The pivoted supporting blocks 96 are positioned diametrically oppositely of each other about the axis of the shaft 33 so that both toggles reach their dead center positions simultaneously. In so doing, the strained toggle springs 97 exert balanced forces about the adjacent end of the shaft 33 so that at the time the valve reversing operation occurs there is practically no friction at the bearing 33b tending to prevent rotation of the shaft and valve assembly. Additionally, the two springs may be of greatly reduced rate in order to obtain the same valve turning force as can be furnished by a single spring 97 of Fig. 4. Therefore the double toggle spring mechanism of the Fig. 6 arrangement has longer life.

Referring to Fig. 7, it will be noted first that the manifold body 15' has a pair of oppositely disposed threaded fittings 105 and 106 which replace the pivoted supporting blocks 96 for the toggle arms or pins 93 of Fig. 6. The fittings 105 and 106 have respective cylindrical sockets 107 and 108 diametrally aligned across the central axis of the toggle assembly 11'. The operating parts of the toggle assembly are very much the same as those of Fig. 6. The toggle lever 120 has diametrically opposite toggle arm portions 92a respectively connected to the cooperating spring opposed toggle arms 93'. The sockets 107 and 108 receive with easy sliding clearance respective spherical end portions 109 of the arms 93'. The spherical elements 109 are forced toward the toggle mechanism 11' by coiled compression springs 110 of equal length and scale, one end of each spring bearing upon a spherical element 109 and the opposite end bearing against the effective bottom of the associated socket. The cylindrical walls of the sockets 107 and 108 guide the spherical ends 109 of the toggle arms 93' for sliding movement and sufficient pivotal movement to enable free operation of the toggle mechanism at each side of the dead center position of the parts. By making the spherical ends 109 slightly smaller than the diameters of the sockets, one of the fittings such as that designated 105 can be used as the main inlet for operating fluid to the manifold constituted by the walls of the body 105'. For that purpose, the fitting 105 has a central through bore 114 in an outer threaded portion 115 of the fitting and to which a supply duct of suitable form may be secured by conventional means. The bore 114 leads to the outer end of the associated socket 107 and since (assuming compressed air is the operating fluid) a small fluid introduction duct suffices, the operating fluid may pass into the interior of the manifold through the clearance space around the spherical toggle arm end 109 of the fitting 105. The operation of the toggle mechanism 11', in so far as balancing the thrust of the springs against the operating shaft 33 at the dead center position of the mechanism, is the same as described in connection with Fig. 6.

In Fig. 7 there is no lost motion between the toggle lever 120 and the valve disc 10. Instead, the toggle lever 120 has a pair of arms 121 and 122 which, at all times, are substantially in contact with the drive pins 90 and 91 of the valve disc. In order to effect snap action operation of the valve disc 10, the necessary lost motion connection between the yoke 75a on the shaft 33 and the toggle lever comprises a pair of arms 123 and 124 on said yoke arranged for alternate contact with the arms 121 and 122 respectively of the toggle lever 120. The yoke 75a is shown in the position in which it has rotated the toggle lever 120 from an initial position (valve disc position shown by Fig. 4) to the dead center position of the toggle mechanism, but without effecting reversal of the fluid porting with reference to the chambers 5 and 6 of the motor. As the toggle mechanism is further driven by the yoke 75a past the dead center position, the coiled compression springs 110 cause the toggle lever 120 to be moved to motor fluid reversing position with a snap action as described in connection with Figs. 4 and 6.

I claim:

1. In a reciprocating piston type fluid operated motor having a piston slidably but non-rotatably mounted in cooperating pressure chambers of a housing, a rotary reversing valve mechanism adapted and arranged to control admission of piston operating fluid alternately to the pressure chambers, and a rod extending into a longitudinal bore of the piston and having a helical cam engaged by a cam follower carried by the piston in its bore, so that the rod is oscillated by the piston during each reciprocation thereof, the rod being operatingly connected to the valve mechanism for causing reversal of operation thereof during operation of the motor.

2. In a reciprocating piston type fluid operated motor having a piston slidably mounted in suitable coaxial cylinder bores of a housing, a rotary reversing valve mechanism coaxial with the cylinder bores and arranged to control piston operating fluid alternately in respect to the cylinder bores, rotatable means slidably engaging the piston axially thereof, an operating cam connection between the piston and said means within the piston for oscillating said means, the latter being connected to the valve mechanism for operating the same in opposite directions as a result of reciprocating movement of the piston.

3. In a reciprocating piston type fluid operated motor having a piston slidably but non-rotatably mounted in suitable pressure cylinders of a housing, a closure for one of the cylinders, a rotary reversing valve mechanism mounted on said closure on a turning axis parallel to the axis of the associated cylinder, a shaft slidably and rotatably disposed in a longitudinal bore of the piston and extending through said cylinder closure and having a rotary lost motion connection with the valve mechanism, means to prevent longitudinal motion of the shaft, a camming connection between the piston and said shaft operating to turn the shaft gradually in opposite directions as the piston reciprocates, and a snap action toggle mechanism operatingly connecting the shaft and the valve mechanism.

4. In a reciprocating piston type fluid operated motor having a piston slidably but non-rotatably mounted in suitable cylinder chambers of a housing, a closure member for one end of one of the cylinder chambers and having valve ports communicating with respective cylinder chambers, non-reciprocating means slidably associated with the piston and including a camming connection between said means and piston arranged to cause turning motion of said means, a journal support for said means in the closure member, a rotary valve disc operating in a fluid supply chamber associated with the closure member and having fluid porting passages cooperating with said ports to reverse the direction of flow of operating fluid from the supply chamber to the cylinder chambers, and a snap action toggle mechanism connecting said means and the valve disc.

5. In a reciprocating piston type fluid operated motor, a housing, a double headed piston slidably mounted in opposite ends of a cylinder in the housing, means respectively closing the cylinder ends, a shaft rotatably mounted in one of said closure means and controlling a fluid reversing valve associated therewith, means carried by the closure means and preventing longitudinal motion of the shaft, a portion of said shaft slidably and rotatably occupying a longitudinal bore of the piston, camming means carried by the piston between said heads, said camming means operating to turn the shaft in opposite directions as the piston reciprocates in the cylinder, said piston having a lubricant retaining space between said heads and a duct communicating with said space and leading to the camming means and shaft.

6. In a fluid operated motor of the reciprocating piston type, a body formed to provide a pair of aligned cylinders, a piston with opposite ends fitting respective cylinders, an end closure for one of the cylinders including a hollow supply manifold for fluid, a valve mechanism located in said manifold and arranged to distribute fluid therefrom alternately to said cylinders for reciprocating the piston, an oscillatable shaft extending through a wall of the closure means and operatingly connected with said valve mechanism, means supported by the body for preventing longitudinal motion of the shaft, and camming means connecting said shaft and piston for oscillating the shaft during reciprocation of the piston.

7. In a reciprocating piston type fluid operated motor having a piston slidably mounted in suitable coaxial cylinder bores of a housing, cylinder heads for the housing, a shaft coaxial with the piston extending through one cylinder head and journalled therein and having an axial thrust bearing in the other cylinder head, reversing valve mechanism operatively connected with the shaft and carried by the cylinder head through which the shaft extends, said reversing valve mechanism being adapted and arranged to control piston operating fluid alternately in said cylinder bores, a helical groove in the shaft where it extends through the piston, and a cam follower carried by the piston entering the bore for the shaft and cooperating with said helical groove thereof to oscillate the shaft and operate the valve mechanism.

8. Mechanism according to claim 7, wherein the shaft has a rotary lost motion connection with the valve mechanism, said connection including a snap action toggle mechanism for operating a fluid controlling element of the valve mechanism.

9. In a reciprocating piston type fluid operated motor, a housing providing opposed pressure chambers, a piston movably mounted in the housing for reciprocation by pressure fluid alternately supplied to the chambers, means forming a fluid supply chamber, reversing valve mechanism for diverting fluid from the supply chamber alternately to the pressure chambers, a toggle lever mounted for oscillation about a fixed axis on the housing and having an operating lost motion connection with the reversing valve mechanism, said lever having an arm extending radially from said axis, a cooperating toggle arm pivotally connected to the outer end of the lever arm, said arms having a dead center position in which the arms are aligned, a mounting for said cooperating toggle arm comprising a socket in which an outer end portion of the cooperating toggle arm is guided for sliding and pivotal motion, and a spring in said mounting operative against said outer end portion of the toggle arm to move said arms out of said dead center position in opposite directions.

10. Mechanism according to claim 9, wherein said outer end portion of the toggle arm is spherical, said spring being contained in the socket and operatively bearing on said spherical end.

11. Mechanism according to claim 9, wherein the mounting for said outer end portion of the toggle arm constitutes an inlet fitting having a passage communicating with the supply chamber through the socket.

12. In a reciprocating piston type fluid operated motor, a housing providing opposed pressure chambers, a piston movably mounted in the housing for reciprocation by pressure fluid alternately supplied to the chambers, means forming a fluid supply chamber, reversing valve mechanism for diverting fluid from the supply chamber alternately to the pressure chambers, a toggle lever mounted for oscillation about a fixed axis on the housing and having an operating lost motion connection with the reversing valve mechanism, said lever having arms extending diametrally across said axis, cooperating toggle arms pivotally connected to respective toggle lever arms and having dead center positions in alignment with each other and the toggle arms, means supporting the outer ends of said toggle arms for sliding and pivotal movement and springs acting on the outer ends of the toggle arms to move the toggle mechanism in opposite directions from dead center position.

LEROY J. CAREY.

REFERENCES CITED

The following references are of record in the file of this patent:

UNITED STATES PATENTS

| Number | Name | Date |
|---|---|---|
| 647,351 | Wood | Apr. 10, 1900 |
| 1,798,520 | Brugh | Mar. 31, 1931 |
| 1,834,607 | Dove | Dec. 1, 1931 |
| 1,853,758 | Brumm | Apr. 12, 1932 |
| 2,060,684 | Moorhouse | Nov. 10, 1936 |
| 2,235,544 | Wold | Mar. 18, 1941 |
| 2,268,898 | Pelouch | Jan. 6, 1942 |
| 2,297,381 | Wylie | Sept. 29, 1942 |

FOREIGN PATENTS

| Number | Country | Date |
|---|---|---|
| 243,774 | Great Britain | Dec. 2, 1925 |